(12) United States Patent
Tomala et al.

(10) Patent No.: US 9,534,845 B2
(45) Date of Patent: Jan. 3, 2017

(54) METHOD FOR MANUFACTURING A REFRACTORY FOR AN INNER LINING OF A BLAST FURNACE AND BLAST FURNACE HAVING THE INNER LINING

(71) Applicant: SGL CARBON SE, Wiesbaden (DE)

(72) Inventors: Janusz Tomala, Raciborz (PL); Christian Wiebel, Meitingen (DE); Frank Hiltmann, Meitingen (DE)

(73) Assignee: SGL Carbon SE, Meitingen (DE)

( * ) Notice: Subject to any disclaimer, the term of this patent is extended or adjusted under 35 U.S.C. 154(b) by 129 days.

(21) Appl. No.: 14/091,629

(22) Filed: Nov. 27, 2013

(65) Prior Publication Data

US 2014/0084525 A1    Mar. 27, 2014

Related U.S. Application Data

(63) Continuation of application No. PCT/EP2012/057338, filed on Apr. 23, 2012.

(30) Foreign Application Priority Data

May 27, 2011  (EP) ..................... 11167940

(51) Int. Cl.
| | | |
|---|---|---|
| *F27D 1/00* | (2006.01) | |
| *C04B 35/52* | (2006.01) | |
| *C04B 35/532* | (2006.01) | |
| *F27B 1/14* | (2006.01) | |
| *C21B 7/06* | (2006.01) | |

(52) U.S. Cl.
CPC ........... *F27D 1/0006* (2013.01); *C04B 35/522* (2013.01); *C04B 35/532* (2013.01); *F27B 1/14* (2013.01); *C04B 2235/3232* (2013.01); *C04B 2235/3826* (2013.01); *C04B 2235/422* (2013.01); *C04B 2235/425* (2013.01); *C04B 2235/428* (2013.01); *C04B 2235/5436* (2013.01); *C04B 2235/616* (2013.01); *C04B 2235/6587* (2013.01); *C04B 2235/77* (2013.01); *C04B 2235/95* (2013.01); *C04B 2235/96* (2013.01); *C04B 2235/9607* (2013.01); *C04B 2235/9669* (2013.01); *C04B 2235/9676* (2013.01); *C04B 2235/9684* (2013.01); *C21B 7/06* (2013.01)

(58) Field of Classification Search
CPC ..................................................... F27D 1/0006
USPC ........................................ 266/197, 280, 286
See application file for complete search history.

(56) References Cited

U.S. PATENT DOCUMENTS

| | | | |
|---|---|---|---|
| 3,083,111 A | | 3/1963 | Nickerson |
| 5,576,254 A | | 11/1996 | Nakamura et al. |
| 6,875,716 B2 | | 4/2005 | Ishii et al. |
| 2014/0084525 A1 | * | 3/2014 | Tomala ................. C04B 35/522 266/197 |

FOREIGN PATENT DOCUMENTS

| | | |
|---|---|---|
| CN | 1116191 A * | 2/1996 |
| EP | 0703198 A2 | 3/1996 |
| EP | 1275626 A1 | 1/2003 |
| EP | 1538223 A2 | 6/2005 |
| EP | 1671928 A1 | 6/2006 |
| JP | 5232006 | 3/1977 |
| JP | 52032006 A | 3/1977 |
| JP | 59217672 A | 12/1984 |
| JP | 06101975 | 4/1994 |

OTHER PUBLICATIONS

Machine generated English Language translation of CN 1116191 A Feb. 1996.*
International Search Report of PCT/EP2012/057338, dated Jun. 28, 2012.
Asbrand M et al: "Development of a supermicroporous, low thermal conductive carbon grade as blast furnace lining", International Colloquium on Refractories in Aachen, vol. 45, Jan. 1, 2002, pp. 48-51, XP008124362.

* cited by examiner

*Primary Examiner* — Scott Kastler
(74) *Attorney, Agent, or Firm* — Laurence A. Greenberg; Werner H. Stemer; Ralph E. Locher

(57) ABSTRACT

A refractory, which is particularly suitable for use in an inner lining of a blast furnace, is obtainable by a process. The process includes providing a mixture containing coke, silicon and a binder. A green block is formed from the mixture. The green block is then baked. The baked block is semi-graphitized at a temperature between 1600 and 2000° C.

19 Claims, No Drawings

METHOD FOR MANUFACTURING A REFRACTORY FOR AN INNER LINING OF A BLAST FURNACE AND BLAST FURNACE HAVING THE INNER LINING

CROSS-REFERENCE TO RELATED APPLICATION

This is a continuation application, under 35 U.S.C. §120, of copending international application No. PCT/EP2012/057338, filed Apr. 23, 2012, which designated the United States; this application also claims the priority, under 35 U.S.C. §119, of European patent application No. EP 11167940.3, filed May 27, 2011; the prior applications are herewith incorporated by reference in their entireties.

BACKGROUND OF THE INVENTION

Field of the Invention

The present invention relates to a method for manufacturing a refractory for an inner lining of a blast furnace, to a blast furnace containing an inner lining including such a refractory and to the use of such a refractory in an inner lining of a blast furnace.

Refractories are characterized in that they retain a high strength at high temperatures, such as at temperatures above 1000° C. Due to this, refractories are used in a plurality of applications, in which high thermal resistances are required, for example in linings of furnaces, kilns, incinerators and reactors, as a material for crucibles for melts or the like.

Refractories used in an inner lining of a blast furnace have, in particular, to meet a plurality of demands, such as a high refractoriness, an adequate thermal conductivity with regard to the blast furnace design, a high mechanical strength including a high compressive strength at temperatures of up to 2000° C., a good resistance to temperature changes, an excellent corrosion resistance and a high oxidation resistance. In particular, a high resistance to dissolution in the liquid hot metal and slag is desirable for a refractory of an inner lining of a blast furnace.

Modern refractories for an inner lining of a blast furnace are based on carbon and graphite materials, because of the high refractoriness, the good resistance to temperature changes and the satisfactory compressive strength of carbon and graphite at temperatures of up to 2000° C. These refractories are typically produced by forming a green block from a raw material mixture including carbonaceous material and baking the green block at a temperature between 1100 and 1300° C. However, standard carbon materials have the disadvantage of providing only a low resistance to alkalis, a low resistance to oxidation, an insufficient resistance to dissolution of carbon material in the liquid hot metal and slag, which are not saturated with carbon, and a relatively high penetrability of liquid hot metal into their pores. In order to at least partially compensate or improve the aforementioned disadvantageous properties of carbon and graphite, specific additives are usually added to the carbon and graphite materials. For example, fine-powdered silicon is often added to such materials, because it causes a reduction of the pore diameter in the refractory—with the conversion to silicon carbide during thermal treatment—to such small values that the penetration of liquid hot metal into the refractory is reduced or even completely avoided. On the other hand, the addition of aluminum oxide increases the resistance of the material to dissolution of carbon in the liquid hot metal and slag.

German patent DE 601 20 675 T2 discloses a method for producing a refractory, which is intended to be particularly suitable for use in a lining of a blast furnace, wherein the method contains the steps of i) providing a mixture including 50 to 80% by weight of a carbonaceous material, such as calcined coke or graphite, 5 to 15% by weight of aluminum oxide powder, 5 to 15% by weight of silicon powder and 5 to 20% by weight of one or more materials selected from the group consisting of metallic titanium, titanium carbide, titanium nitride and titanium carbonitride, ii) adding a binder to this mixture, iii) forming a green block from the mixture of step ii) and baking the green block at a temperature of 1250° C. The addition of 5 to 20% by weight of the at least one material selected from the group consisting of metallic titanium, titanium carbide, titanium nitride and titanium carbonitride is intended to improve the resistance of the refractory to molten iron, whereas the addition of silicon is intended to cause a comparatively small pore diameter in the refractory. Even if the material is in principle suitable for the use in an inner lining of a blast furnace, the thermal conductivity and the mechanical strength of this material are in need of improvement. The same applies for the other known refractories mentioned above.

SUMMARY OF THE INVENTION

Accordingly, the object underlying the present invention is to provide a refractory, which has in particular an excellent thermal conductivity and a high mechanical strength and which also provides a good resistance against dissolution in the molten hot metal and slag, a good corrosion resistance as well as a small penetrability of liquid hot metal and reactive gases, such as carbon monoxide and carbon dioxide, into its pores, so that it is perfectly well suitable for use in an inner lining and in particular in the inner lining of a blast furnace. Moreover, the refractory shall be stable even if shaped to a block having comparatively large dimensions.

According to the present invention, this object is satisfied by a refractory particularly for the use in an inner lining of a blast furnace, which is obtainable by a process including the following steps:

a) providing a mixture containing
  coke,
  silicon, and
  binder,
b) forming a green block from the mixture provided in step a),
c) baking the green block of step b) and
d) semi-graphitizing the baked block of step c) at a temperature between 1600 and 2000° C.

This solution is based on the surprising finding that a refractory, which is obtainable by semi-graphitizing a baked block made of a mixture containing coke, silicon and binder at a temperature between 1600 and 2000° C., has a good resistance to dissolution of carbon material in the molten hot metal and slag. It also has a good corrosion resistance, a small penetrability of liquid hot metal and reactive gases into its pores (due to the fact that its pores have a comparatively small diameter), a good resistance to temperature changes as well as a high refractoriness. Moreover, it also has an improved thermal conductivity and an improved mechanical strength, such as an improved compressive strength at temperatures of up to 2000° C. An excellent thermal conductivity of the refractory is advantageous for two reasons, namely firstly because it reduces possible damage to or destruction of the refractory and secondly because it leads to a high heat flux leading to a lower surface temperature of hot parts of the refractory which are in contact with the hot metal and the slag. This in turn allows the formation of a protective layer of highly viscous iron adhering to the refractory, which again increases the erosion and corrosion resistance of the refractory. It also supports the application of thinner hearth walls to increase the working volume of the blast furnace.

In particular, the thermal conductivity and the mechanical strength of a refractory are, above all, improved—in comparison to a material containing highly conductive synthetic graphite, e.g. graphite as used in connecting pins for graphite electrodes used in electric arc furnaces, as main raw material, which is only baked at a temperature of about 1100 to 1300° C., if the baked block is subjected to a semi-graphitization at a temperature between 1600 and 2000° C. Without being wished to be bound to a theory, the inventors of the present patent application believe that the improvement of the thermal conductivity and also the improvement of the mechanical strength are particularly due to the fact that during the heat treatment at 1600 and 2000° C. amorphous carbon included in the green block is at least partially converted into graphite or into a graphite-like structure. Additionally, the semi-graphitization of the baked block at a temperature between 1600 and 2000° C. leads to a homogenization of the composition and of the microstructure of the refractory. Moreover, the silicon included in the green block contributes to these effects, because a part of this silicon reacts during the baking and during the semi-graphitization with carbon to produce silicon carbide in the form of needle like crystals, which further improve the mechanical strength of the refractory. However, because the final semi-graphitization is not performed at a temperature above 2000° C., as would be used during a conventional graphitization, a decomposition of the silicon carbide crystals formed during the baking, which would occur in a conventional graphitization step, is reliably avoided. Consequently, the addition of silicon to the mixture for forming the green block and the subsequent semi-graphitization of the baked block at a temperature between 1600 and 2000° C. cooperate synergistically and synergistically increase the mechanical strength of the refractory. All in all, the semi-graphitization of the baked block at a temperature between 1600 and 2000° C. advantageously influences three properties of the refractory: firstly it significantly increases the thermal conductivity of the refractory, secondly it significantly increases the mechanical strength of the refractory and thirdly it improves the erosion and corrosion resistance of the refractory.

On account of its excellent mechanical strength and its excellent thermal conductivity, the refractory according to the present invention further has the advantage that it is stable, even if it is shaped to a block having comparatively large dimensions, such as a W×H×L of at least 700×700× 2500 mm. This is particularly advantageous, because if large blocks are used for a lining the number of block joints in a lining of a given size can be reduced and the stability of the lining can thus be increased, because the block joints are the weak point of the lining.

Apart from that, the silicon further leads to the formation of a microporous structure, which means that the cumulated porosity from pores with a diameter above 1 μm does not exceed 4% of the sample volume, which is usually measured by mercury porosimetry. Due to this microporous structure, the refractory according to the present invention has a small penetrability for liquid hot metal and reactive gases.

Due to all the aforementioned advantageous properties, the refractory according to the present invention is perfectly suited for use in an inner lining and in particular in the inner lining of a blast furnace.

As set out above, semi-graphitization denotes in the sense of the present patent application a heat treatment performed at a temperature between 1600 and 2000° C. Thus, the term semi-graphitization is only used in the present patent application to make clear that it is believed that during this step amorphous carbon is at least partially converted into graphite or into a graphite-like structure.

In principal, the present invention is not limited concerning the type of coke used in step a) for the preparation of the mixture. Thus, in principal all types of coke can be used, such as petroleum coke, anthracite, coal-tar pitch coke, acetylene coke, metallurgical coke or the like.

However, according to a first particularly preferred embodiment of the present invention in step a) coke is used, with at least a part of the coke being isotropic coke. Isotropic cokes are characterized by a high coefficient of thermal expansion without preferred orientation. Surprisingly, the use of isotropic coke leads to a refractory with a particularly high mechanical strength. This is presumably due to the fact that the isotropic coke shrinks during the semi-graphitization step more homogenously than anisotropic coke and thus leads to a refractory with a more homogenous microstructure. Moreover, the use of isotropic coke contributes to an isotropic thermal conductivity of the refractory. Particular good results are obtained, if at least 50% by weight of the coke used in step a) consists of isotropic coke. Even better results are obtained, if the coke applied in step a) consists of at least 80% by weight, preferably of at least 90% by weight, more preferably of at least 95% by weight, even more preferably of at least 99% by weight and most preferably solely of isotropic coke.

According to a second particularly preferred embodiment of the present invention in step a) coke is used with comparatively low iron content. This embodiment is based on the finding that the use of coke with a comparatively low iron content improves the corrosion resistance and particularly the carbon monoxide resistance, the carbon dioxide resistance and the oxidation resistance of the refractory. Moreover, as a secondary effect, the use of coke with comparatively low iron content improves the hot metal resistance. Accordingly, it is preferred that the coke used in step a) has an iron content of at most 0.1% by weight, more preferably of at most 0.05% by weight, even more preferably of at most 0.01% by weight, especially preferably of at most 0.005% by weight and most preferably of at most 0.001% by weight.

Apart from the silicon and the coke, the mixture provided in step a) advantageously further contains graphite. The addition of a certain amount of graphite facilitates the baking process and increases the thermal conductivity of the finished product.

All kinds of natural and synthetic graphite's can be used and particular good results are obtained with synthetic graphite.

Likewise, the present invention is not particularly limited with regard to the amount of coke and graphite added in step a). However, good results are notably obtained, if the mixture provided in step a) contains 60 to 85% by weight and preferably 65 to 75% by weight of a mixture of coke and of graphite based on the dry aggregate of the refractory. With dry aggregate of the refractory according to the present invention the sum of all ingredients of the refractory except the binder is meant.

As set out above, the silicon effects the formation of a microporous structure in the refractory, which leads to a small penetration tendency of liquid hot metal and reactive gases of the refractory. Moreover, the silicon contributes, in synergistic cooperation with the semi-graphitization to a high mechanical strength of the refractory according to the present invention, because a part of the silicon reacts during the baking and during the semi-graphitization with carbon to produce silicon carbide in the form of needle-like crystals. In order to achieve both effects to a sufficient degree, it is preferable that the mixture provided in step a) contains 5 to 15% by weight and more preferably 8 to 12% by weight of silicon based on the dry aggregate of the refractory.

According to a further particularly preferred embodiment of the present invention the mixture provided in step a) further contains titanium dioxide. The addition of titanium dioxide increases the viscosity of liquid hot metal at the interface with the refractory and improves on account of this reason the erosion and corrosion resistance of the refractory. In order to obtain a high degree of this advantageous effect, it is preferred that the mixture provided in step a) contains 6 to 14% by weight and more preferably 8 to 12% by weight of titanium dioxide based on the dry aggregate of the refractory.

According to a still further particularly preferred embodiment of the present invention, the mixture provided in step a) further contains a silicon carbide-carbon powder mix (SiC-C powder), which contains at least 50% by weight of silicon carbide. The addition of SiC-C powder improves the oxidation resistance as well as the mechanical resistance of the refractory. Good results in this regard are particularly achieved, if the mixture provided in step a) includes 4 to 15% by weight and preferably 8 to 12% by weight of SiC-C powder based on the dry aggregate of the refractory.

Last but not least, the mixture provided in step a) contains at least one binder. The binder may be any binder known in this field, such as one selected from the group consisting of coal-tar pitch, petroleum pitch, phenolicresin, furfurylicresin, coal tar, petroleum tar and any mixture of two or more of the aforementioned compounds. The amount of the binder is preferably selected in such an amount that a workable paste is obtained, which means that a suitable viscosity of the paste for the forming process is obtained.

All in all, the refractory according to the present invention is obtainable from a mixture, which has to contain coke, silicon, binder and optionally graphite and/or titanium dioxide and/or SiC-C powder. It is preferred that the mixture provided in step a) includes coke, silicon, binder and at least one compound selected from the group consisting of graphite, titanium dioxide and SiC-C powder. It is more preferred that the mixture provided in step a) includes coke, silicon, binder, graphite and titanium dioxide and optionally also SiC-C powder.

According to a further particular preferred embodiment of the present invention, the mixture provided in step a) includes i) coke, preferably isotropic coke having an iron content of at most 0.1% by weight, ii) silicon, iii) graphite, preferably synthetic graphite, iv) titanium dioxide, v) SiC-C powder and iv) at least one binder, wherein the single components are preferably contained in the mixture in the aforementioned amounts.

Merely by way of example, the mixture provided in step a) may contain:
i) a mixture of:
60 to 80% by weight of a mixture of coke, preferably coke having an iron content of at most 0.1% by weight, and of graphite,
7 to 12% by weight of silicon,
8 to 13% by weight of titanium dioxide,
6 to 13% by weight of silicon carbide-carbon powder, wherein the sum of the aforementioned ingredients is 100% by weight, and
ii) at least one binder.

According to an even more preferred embodiment of the present invention, the mixture provided in step a) contains:
i) a mixture of:
65 to 75% by weight of a mixture of coke, preferably coke having an iron content of at most 0.1% by weight, and of graphite,
9 to 11% by weight of silicon,
9 to 11% by weight of titanium dioxide,
8 to 11% by weight of silicon carbide-carbon powder, wherein the sum of the aforementioned ingredients is 100% by weight, and
ii) at least one binder.

The forming of the green block in step b) can be performed by any method known to a person skilled in the art, such as by block-pressing, extrusion, hot-pressing or vibromolding.

Concerning the baking temperature, the present invention is not particularly limited. Good results are obtained in this regard, if in step c) the green block is baked at a temperature between 700 and 1200° C., preferably between 800 and 1100° C. and more preferably between 800 and 900° C.

As set out above, it is one of the most important features of the present invention that the baked block is semi-graphitized in step d) at a temperature between 1600 and 2000° C. The thermal conductivity of the refractory tends to be higher, as the semi-graphitization temperature becomes higher. Due to this, it is preferred that in step d) the baked block is semi-graphitized at a temperature between 1700 and 2000° C., more preferably between 1800 and 2000° C. and most preferably between 1900 and 2000° C.

According to another preferred embodiment of the present invention, the heat treated block, i.e. the baked and/or semi-graphitized block, may be impregnated before and/or after the semi-graphitization according to step d) with an impregnation agent, such as e.g. with coal tar, petroleum tar, coal-tar pitch, petroleum pitch, resin or the like, to fill the pores in order to increase the apparent density, the mechanical strength and the thermal conductivity of the final product. After the impregnation, the blocks are rebaked preferably at a temperature between 700 and 1200° C., more preferably at a temperature between 800 and 1100° C. and even more preferably at a temperature between 800 and 900° C., in order to carbonize the impregnation agent. The impregnation and rebaking may be repeated several times. Preferably, the rebaking after the final impregnation step and the semi-graphitization are performed concurrently, i.e. in one step, which is particularly preferred, if the semi-graphitization is the final heat treatment step.

According to a further particular preferred embodiment of the present invention, the steps c) and d) are performed concurrently, i.e. in one step, particularly if the block is not impregnated and rebaked before the semi-graphitization.

Due to the high mechanical stability of the refractory, the refractory according to the present invention is even stable in the long term when it has comparatively large dimensions. Because the block joints arranged between the single blocks of a lining are the weak point of the lining and because the number of block joints in a lining of a given size can be reduced if large blocks are used for a lining, it is preferable for the refractory according to the present invention to be formed into an article with comparatively large dimensions, such as to a block having comparatively large dimensions, such as a W×H×L of at least 700×700×2500 mm.

Moreover, the present invention relates to a blast furnace containing an inner lining, wherein the inner lining contains at least one above described refractories.

A further subject matter of the present invention is the use of the afore-mentioned refractory in an inner lining of a blast furnace.

DETAILED DESCRIPTION OF THE INVENTION

In the following the present invention will be described in more detail by way of a non-limiting example.

A refractory was prepared by first preparing a mixture containing:

74 parts by weight of a mixture of isotropic coke, such as coal-tar pitch coke, or petroleum coke having an iron content of 0.01% by weight and of synthetic graphite, 9 parts by weight of metallic silicon powder having a maximum grain size of 63 μm, 9 parts by weight of titanium dioxide (rutilite) having a maximum grain size of 45 μm, and 8 parts by weight of SiC-C powder having a maximum grain size of 63 μm.

To this mixture coal-tar pitch was added as a binder in such an amount that a workable paste, i.e. a paste having a suitable viscosity for the forming process, was obtained.

For the mixing step for example a sigma-blade mixer may be used.

Then, the mixture was formed by vibro-molding into green blocks having each a dimension of (W×H×L) 630×630×2500 mm, before the blocks were baked in a coke breeze packing at a maximum temperature of 850 to 1000° C.

Afterwards, the baked blocks were semi-graphitized in an Acheson furnace at a final temperature of 2000° C.

The blocks obtained with this method had the following properties:
apparent density: 1.72 g/cm3,
cold crushing strength: 42 MPa,
thermal conductivity: 45 W/m.K, and
pore size distribution: sum of open porosity from pores with a diameter of larger than 1 μm equaled 2.7% of the sample volume.

A refractory was prepared as described in example 1, except that—instead of the semi-graphitization at a final temperature of 2000° C.—the baked bodies were submitted to a graphitization treatment at 2500° C. in an Acheson furnace.

The blocks obtained with this method had the following properties:
apparent density: 1.71 g/cm3,
cold crushing strength: 27 MPa,
thermal conductivity: 85 W/m.K, and
pore size distribution: sum of open porosity from pores with a diameter of larger than 1 μm equaled 7.0% of sample volume.

The invention claimed is:

1. A method of manufacturing a refractory, which comprises the steps of:
providing a mixture containing coke having an iron content of at most 0.1% by weight, silicon and a binder;
forming a green block from the mixture;
baking the green block at a temperature between 700 and 1200° C. and resulting in a baked block; and
semi-graphitizing the baked block at a temperature between 1600 and 2000° C.

2. The method according to claim 1, which further comprises providing the coke to contain at least 50% by weight of isotropic coke.

3. The method according to claim 1, which further comprises adding graphite to the mixture.

4. The method according to claim 3, which further comprises providing a synthetic graphite as the graphite.

5. The method according to claim 3, which further comprises providing the mixture to contain 60 to 85% by weight of a mixture of the coke and of the graphite based on a dry aggregate of the refractory.

6. The method according to claim 1, which further comprises providing the mixture to contain 5 to 15% by weight of the silicon based on a dry aggregate of the refractory.

7. The method according to claim 1, which further comprises providing the mixture to contain 6 to 14% by weight of titanium dioxide based on a dry aggregate of the refractory.

8. The method according to claim 1, which further comprises providing the mixture to contain 4 to 15% by weight of a silicon carbide-carbon powder mix based on a dry aggregate of the refractory, which contains at least 50% by weight of silicon carbide.

9. The method according to claim 1, which further comprises selecting the binder from the group consisting of coal-tar pitch, petroleum pitch, phenolic resin, furfurylic resin, coal tar, petroleum tar and any mixture of at least two of the aforementioned compounds.

10. The method according to claim 1, which further comprises providing the mixture to contain:
65 to 75% by weight of the coke having the iron content of at most 0.1% by weight and of graphite;
9 to 11% by weight of the silicon;
9 to 11% by weight of titanium dioxide;
8 to 11% by weight of silicon carbide-carbon powder, wherein a sum of the aforementioned ingredients is 100% by weight except for the binder; and
the binder.

11. The method according to claim 1, which further comprises performing the forming step by one of block pressing, extrusion, hot pressing or vibro-molding.

12. The method according to claim 1, which further comprises semi-graphitizing the baked block at a temperature between 1700 and 2000° C.

13. The method according to claim 1, which further comprises:
impregnating the baked block one of before or after the semi-graphitization step with an impregnation agent selected from the group consisting of coal tar, petroleum tar, coal-tar pitch, petroleum pitch, resin and mixtures of at least two of the aforementioned compounds resulting in an impregnated green block; and
rebaking the impregnated green block at a temperature between 700 and 1200° C.

14. The method according to claim 1, which further comprises performing the baking step and the semi-graphitizing step concurrently.

15. The method according to claim 1, which further comprises providing the coke to contain at least 99% of isotropic coke.

16. The method according to claim 1, wherein the coke has an iron content of at most 0.001% by weight.

17. The method according to claim 1, which further comprises providing the mixture to contain:

60 to 80% by weight of the coke having an iron content of at most 0.1% by weight and of graphite;

7 to 12% by weight of the silicon;

8 to 13% by weight of titanium dioxide;

6 to 13% by weight of silicon carbide-carbon powder, wherein a sum of the aforementioned ingredients is 100% by weight except for the binder; and the binder.

18. A blast furnace, comprising:

an inner lining containing at least one refractory formed by the process steps of:
  providing a mixture containing coke having an iron content of at most 0.1% by weight, silicon and a binder;
  forming a green block from the mixture;
  baking the green block at a temperature between 700 and 1200° C. and resulting in a baked block; and
  semi-graphitizing the baked block at a temperature between 1600 and 2000° C.

19. A method of making an inner lining for a blast furnace, which comprises the steps of:

forming a refractory by the steps of:
  providing a mixture containing coke having an iron content of at most 0.1% by weight, silicon and a binder;
  forming a green block from the mixture;
  baking the green block at a temperature between 700 and 1200° C. and resulting in a baked block;
  semi-graphitizing the baked block at a temperature between 1600 and 2000° C. resulting in the refractory; and forming the refractory into a shape of the inner lining for the blast furnace.

* * * * *